[63.]
RICHARD T. YARDLEY.
Improvement in Bale Hooks.
No. 119,213.                                Patented Sep. 19, 1871.
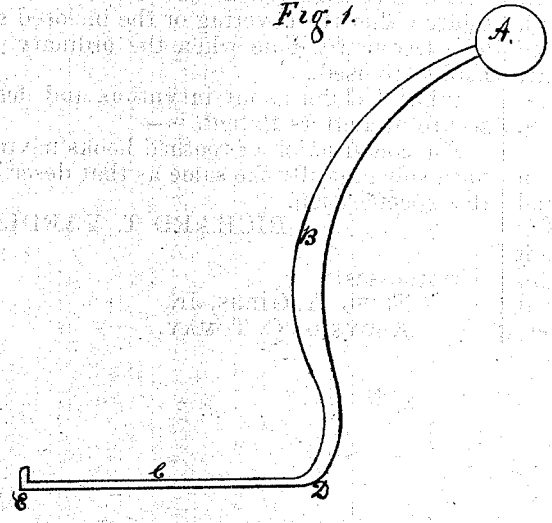
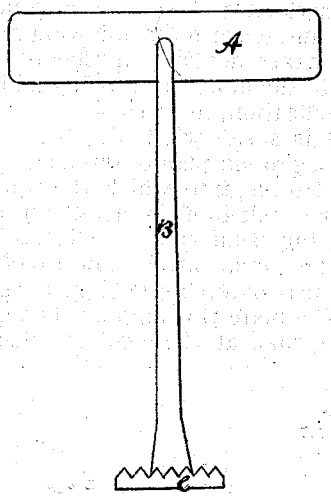
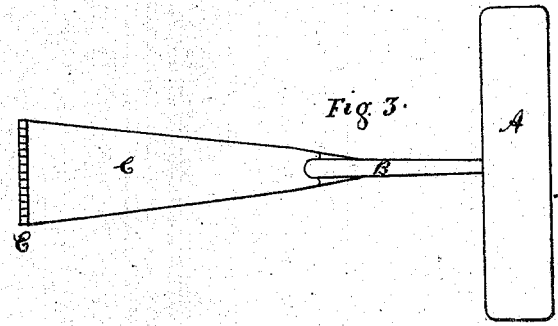
Witnesses                                   Richd. T. Yardley
Scale 6 inches to a foot.

UNITED STATES PATENT OFFICE.

RICHARD T. YARDLEY, OF BALTIMORE, MARYLAND.

IMPROVEMENT IN BALE-HOOKS.

Specification forming part of Letters Patent No. 119,213, dated September 19, 1871.

*To all whom it may concern:*

Be it known that I, RICHARD T. YARDLEY, of the city and county of Baltimore and State of Maryland, have invented certain new and useful Improvements in the construction of Bale-Hooks, being hooks used in turning and moving bales of goods covered with canvas or other woven materials; and declare the following to be a full, clear, and exact description thereof, reference being had to the annexed drawing making part of this specification, in which—

Figure 1 is a side view, Fig. 2 a front view, and Fig. 3 a ground plan of the hook.

A is the handle, into which the upper end of the stem or shank B of the hook is inserted and secured in the usual manner. The shank B is flattened and spread at the lower end, where it terminates in a plate, C, extending at right angles from it. The plate C is angular, being wider at the point E than at the bend D, where it coincides with and is united to the shank B; or, in other words, the plate C is a continuation of the shank B, but bent at right angles to it at the point D. The plate C is bent upward at the point E high enough to allow suitable teeth to be cut in it, as shown on the drawing.

Hooks constructed as above described do not injure either the covering or the inclosed goods, as is frequently done when the ordinary prong-hooks are used.

What I claim as my invention, and desire to secure by Letters Patent, is—

The construction of toothed hooks having the form substantially the same as that described in this specification.

RICHARD T. YARDLEY.

Witnesses:
EDWD. A. GIBBS, Jr.,
ALOYSIUS G. TOMAY. (63.)